UNITED STATES PATENT OFFICE.

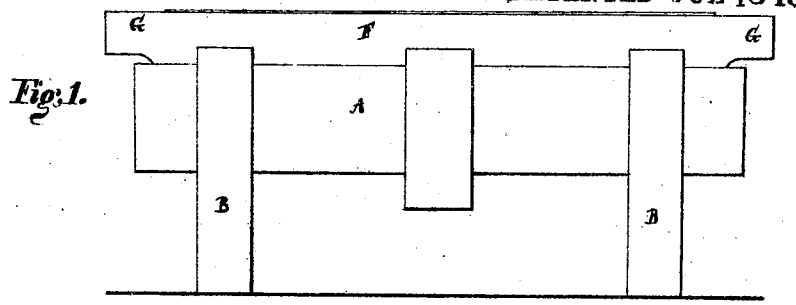
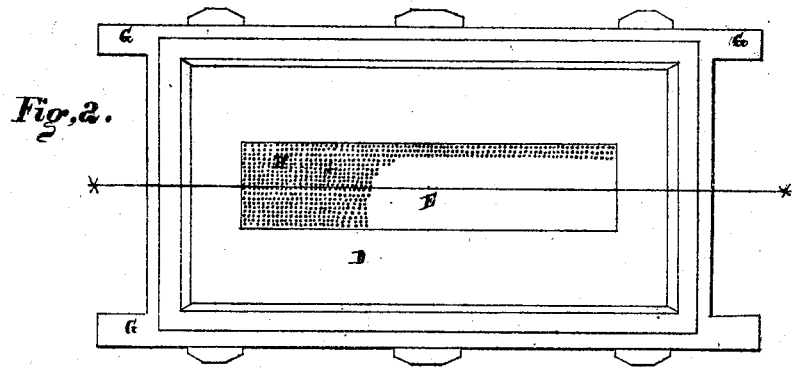
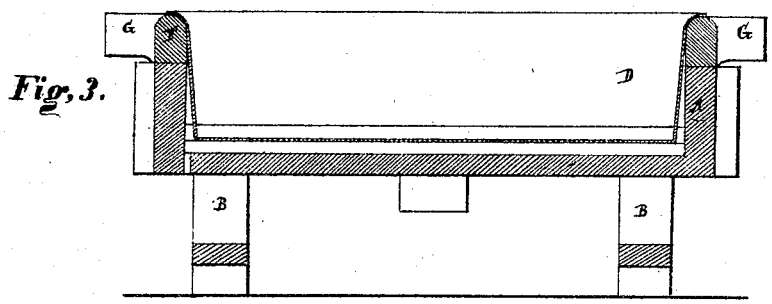
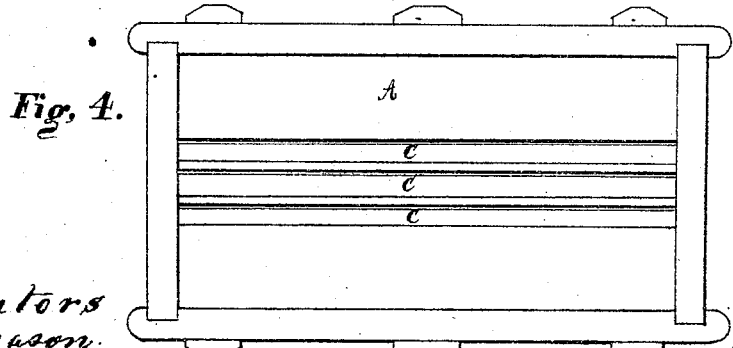

RALPH MASON AND SIDNEY MASON, OF BURGH HILL, OHIO.

IMPROVEMENT IN CURD-STRAINERS.

Specification forming part of Letters Patent No. 117,093, dated July 18, 1871.

*To all whom it may concern:*

Be it known that we, RALPH MASON and SIDNEY MASON, of Burgh Hill, in the county of Trumbull and State of Ohio, have invented new and useful Improvements in Curd-Strainers for Dairies, of which the following is a description, reference being had to the accompanying drawing making part of this specification.

Figure 1 is a side view of the curd-strainer. Fig. 2 is a plan view. Fig. 3 is a vertical longitudinal section in direction of the line $xx$. Fig. 4 is an inside view of the vat, having the strainer removed therefrom.

Like letters of reference refer to like parts in the different views.

The nature of this invention relates to a strainer, and the object of the same is to strain the curd from the whey in the manufacture of cheese.

The construction and practical use of the same are as follows, viz.: A, Figs. 1 and 4, represents the whey-vat, and which is in shape an oblong square box of no considerable depth, and mounted upon the legs B. The bottom of said vat slants slightly downward from the sides to the middle for the purpose of causing the whey to flow into the longitudinal channels C for being conducted off from the vat. To the inside of the above-described vat is fitted the strainer D. Said strainer is made of sheet metal, having in whole or in part a perforated bottom, E, which is also slightly slanting from the sides toward the middle. The upper edge of the strainer is secured to a frame of wood, F, Fig. 1, having handles G, whereby it can be lifted onto or off from the vat, upon the edge of which it rests, as shown in said Fig. 1.

The practical use of this strainer is as follows: The prepared curd is put into the strainer, from which the whey will flow through the perforated bottom, or perforated portion H thereof, into the vat, from which it is conducted away by the channels C to the outside to the whey-tub. The strainer, as will be seen, does not closely fill the inside of the vat, there being a space between the sides and bottom of the vat to allow the whey to flow freely away, which, when the curd is sufficiently drained, the strainer is removed, together with the curd, and carried to the press.

By the use of this strainer the whey can be more effectually removed from the curd than it can be by the use of a cloth in the ordinary way. It also admits of the curd being worked more conveniently during the process of straining than it can be when confined in a cloth. It is also much easier kept clean and sweet, as every part of the strainer is accessible for cleaning, and which can be easily and readily done. Instead of the perforated metal strainer H wire-cloth can be used, but for ordinary use the perforated metal is preferred.

What we claim as our improvement, and desire to secure by Letters Patent, is—

The herein-described curd-strainer, consisting of the vat A having channels C in the bottom thereof, and metal strainer D constructed with a perforated bottom, H, and frame F, in combination therewith, substantially in the manner as described, and for the purpose set forth.

RALPH MASON.
SIDNEY MASON.

Witnesses:
HIRAM CHAPMAN,
R. C. BEEBE.